3,316,310
PURIFICATION OF NAPHTHOL
François Pierrot, 26 Rue Roussy, Lyon, France, and François Contat, 24 Ave. du Dr. Terver, Ecully, France
No Drawing. Filed Oct. 28, 1963, Ser. No. 319,498
Claims priority, application France, Oct. 26, 1962, 913,559
8 Claims. (Cl. 260—621)

The present invention relates to a new process for the extraction of naphthol from certain media containing it, as well as to the purification of the product obtained; it relates particularly to the obtaining of alpha-naphthol of a desired degree of purity from mixtures in which this heavy phenol is accompanied by other naphthalene derivatives.

The process according to the invention is particularly useful in the extraction of naphthols, in particular alpha-naphthol, from mixtures obtained by the dehydrogenation of oxygenated cycloaliphatic compounds such as tetralone and/or tetralol. When alpha-naphthol is thus made from alpha-tetralone and/or tetralol, it is generally accompanied by other substances which, in greater or lesser proportions, can include 5,6,7,8-tetrahydro-alpha-naphthol, alpha-tetralone or 1-keto-1,2,3,4-tetrahydronaphthalene, alpha-tetralol or 1-hydroxy-1,2,3,4-tetrahydronaphthalene, naphthalene, 1,2- and 1,4-dihydronaphthalenes, Tetralin, i.e. tetrahydronaphthalene, heavy products and tars.

The isolation of pure alpha-naphthols from such mixtures is a difficult problem, for the known methods of distillation and of alkaline extraction do not give satisfactory results. While the distillation easily separates the light fractions, consisting of the precipitated hydrocarbons and the heavy products, it is unable to separate the tetralone from the naphthol; this is due to the fact that these two latter compounds form (in the entire range of pressures useful in distillation) an azeotrope at the maximum boiling point; thus at 40 mm. Hg this gives a mixture of 77% of alpha-naphthol boiling at 187° C.; at 760 mm. Hg the azeotrope contains 74% of naphthol and boils at 290° C. It is thus not practically possible to obtain naphthol of more than 74 to 77% content by ordinary distillation. As for azeotropic or extractive distillation, in the presence of other compounds which modify the relative volatility of the tetralone and the naphthol, these do not produce a satisfactory solution. Extraction by means of an alkaline wash entrains, together with the alpha-naphthol, the tetrahydronaphthol and a considerable proportion of the tetralone and the tar. It is thus evident that the similarity between he properties of naphthol, tetralone and tetrahydronaphthol renders the separation of the naphthol very difficult, and does not permit it to be purified by the classical method.

The process according to the invention permits, by contrast a practically entire separation of naphthol from the accompanying compounds. The invention provides means which is readily applicable on an industrial scale for obtaining naphthol of any desired degree of purity from mixtures which can contain any proportion of tetralone, tetrahydronaphthol and/or other naphthalenic derivatives.

The process according to the invention consists in separating the naphthol from the accompanying compounds by crystallisation in an aliphatic or alicyclic hydrocarbon having at least five carbon atoms per molecule.

The investigations which have led to the present invention have disclosed the previously unknown fact that the alpha-naphthol behaves very differently from the tetralone in certain aliphatic solvents. It has thus been found possible to separate the naphthol by fractional crystallisation, provided that additional solvents are used comprising alicyclic hydrocarbons preferably having to 12 carbon atoms, which may bear alkyl groups substituents, or comprising aliphatic hydrocarbons of more than 5 carbon atoms and boiling below 150° C.

Amongst the hydrocarbon solvents suitable for th crystallisation of the alpha-naphthol from such mixture the following are particularly suitable: cyclohexane methyl-cyclohexane, cycloheptane, cyclopentane, methyl cyclopentane, Decalin (decahydronaphthalene) and th commercial solvents known under the names of spirit C and spirit E.

It is known that the latter spirits are made up of major part of aliphatic hydrocarbons and very little aromatic material; they are characterised by the following properties:

|  | Spirit C | Spirit E |
| --- | --- | --- |
| Density at 150° C | 0.696 | 0.72 |
| Distillation temperature, ° C | 70–100 | 100–13( |
| Aniline point | 62 | 5 |
| Kauri-butanol index |  | 2 |
| Aromatic compounds (percent by volume) | 2.5 | ( |
| Rate of evaporation with respect to normal butyl acetate | 5.4 | 2.2 |

The proportion of the solvent and the respective temperatures of solution and crystallisation vary, according to the composition of the mixture from which the naphthol is to be extracted and the nature of the solvent used, between limits which can be determined or chosen without difficulty by those skilled in the art. More often than not the proportion of solvent is 1 to 10 parts by weight per part of the mixture.

By way of non-limitative example, in the case of mixtures containing 60 to 80% of alpha-naphthol and 20 to 35% of tetralone, the proportions of solvent are about 1 to 5 parts by weight per part of mixture to be treated. The dissolution of the mixture in the solvent takes place generally at a temperature between the ambient and that at which the solution obtained boils; temperatures near or equal to the boiling point of the solvent are particularly recommended, for example about 80° C. with cyclohexane, 100° C. for methyl cyclohexane, 100° to 130° C. for spirit E. The crystallisation is carried out at a temperature below that of the dissolution, for example between the ambient temperature and 0° C.

The separation according to the invention may be carried out in a single procedure, i.e. by extraction of the substances accompanying the naphthol by means of solvent at a selected temperature, for example the ambient; the naphthol containing mixture must then be agitated with the solvent sufficiently long to bring about the solution of the compounds other than the naphthol.

The results of the separation according to the invention are better in proportion to the amount of naphthol in the mixture. It is especially preferable that this amount should be above 50% by weight or better, 60%. Therefore, according to a preferred method of carrying out the invention applicable to mixtures containing less naphthol, the mixture is first enriched with naphthol by distillation, after which the concentrated fraction is treated with the aliphatic or alicyclic solvent so as to separate the crystallised naphthol.

In this latter method of carrying out the invention it is desired to have the least possible tetralone in the fraction enriched with naphthol. If the mixture initially contains much tetralone, for example more than 0.5 times the amount of alpha-naphthol, it is recommended to recover, during the distillation, a fraction as poor as possible in tetralone and rich in naphthol, i.e. a fraction of the composition near or equal to that of the tetralone-naphthol azeotrope.

is possible to obtain an overall yield of nearly 100% naphthol extracted if, after the first separation of the naphthol, the solvent is removed from the mother liquor the residue is subjected to an enrichment with naphthol, by fractional distillation, and retreated with solvent as to bring about recrystallisation of the naphthol.

If the initial mixture to be treated has to be enriched fractional distillation, as indicated above, there may be added to it the residual mixture mentioned in the previous paragraph, the resultant mixture then being submitted to enrichment and the operations being carried out continuously.

The purity of the alpha-naphthol crystallised according the invention can be further improved by a second crystallisation in one of the solvents used according to the invention. It is thus of value to operate with the same solvent as in the primary crystallisation and to work in a methodical cycle; the pure solvent is used in the second crystallisation of which the mother liquor is employed in the first. The number of successive crystallisations can of course be increased, but this is not generally necessary; experience of carrying out the process shows that after two successive crystallisations the alpha-naphthol does not contain more detectable impurities.

The method of carrying out the invention will be illustrated by the following non-limitative examples.

*Examples 1 to 8*

The operations of separation of alpha-naphthol, comprising two successive crystallisations, were carried out with different solvents on the same initial mixture which contained, by weight:

|  | Percent |
|---|---|
| Alpha-naphthol | 74 |
| Tetrahydro-alpha-naphthol | 1.5 |
| Tetralone | 23.3 |
| Tars | 1.2 |

In each of these eight examples, the results of which are shown in Table I below, the initial mixture was treated with the mother liquor derived from a purification by recrystallisation of previously prepared alpha-naphthol with fresh solvent. In other words, the two columns of yield and melting points of naphthol obtained, shown in Table I, indicate the results which can be obtained in a continuous process where the first crystallisation is carried out with the mother liquor of the second one, this latter using fresh solvent recovered by distillation after the first crystallisation.

The initial mixture was dissolved in the boiling mother liquor, after which crystallisation was allowed to take place at about 22° C. The crystals obtained were dried and weighed and their melting point determined. They were then taken up in the same quantity of fresh boiling solvent; after a second crystallisation at 22° C., the weight and the melting point of the naphthol crystals obtained were noted.

In Table I below the yield is the weight of naphthol crystallised, obtained for 100 kg. alpha-naphthol contained in the initial mixture treated.

The column headed "Proportion" indicates the weight of solvent used in kg. per kg. of the initial mixture treated.

It is seen that the melting points of the products obtained, especially after the second crystallisation, are very near 96° C., i.e., that of pure alpha-naphthol; the purity of the product obtained is thus very good.

*Example 9*

The initial mixture had the following compositions by weight:

|  | Percent |
|---|---|
| Alpha-naphthol | 65 |
| Tetrahydronaphthol | 0.5 |
| Alpha-tetralone | 33.5 |
| Tars | 1.0 |

1000 parts by weight of this mixture were treated at reflux, as described above, with 2000 parts of boiling cyclohexane. After crystallisation at the ambient temperature and separation and drying of crystals, 286 parts by weight of dry product were obtained melting at 95.05° C.; the yield was 44% with respect to the 650 parts by weight of alpha-naphthol in the mixture treated.

The 2665 parts of remaining mother liquor were distilled and there were obtained:

1945 parts cyclohexane
219 parts tetralone containing 2% of tetrahydronaphthol and 0.5% of naphthol
486 parts of a new mixture enriched in alpha-naphthol
9 parts of residue 486 parts of enriched mixture contained:

|  | Percent |
|---|---|
| Alpha-naphthol | 74.1 |
| Tetrahydronaphthol | 0.2 |
| Alpha-tetralone | 25.3 |
| Tars | 0.4 |

This mixture in its turn was treated with cyclohexane and there was obtained very pure naphthol in a yield of 61.2%; the total yield of the two treatments with respect to the 650 parts by weight of initial naphthol amounted to 77.8%.

The treatment was repeated a third time, on the fraction rich in naphthol, obtained by distillation of the mother liquor remaining after the second treatment; the entire yield was then raised ot 90.5%.

*Example 10*

A mixture containing:

|  | Percent |
|---|---|
| Alpha-naphthol | 61.3 |
| Dihydronaphthalene | 21.6 |
| Tetralone | 8.2 |
| Tetralin | 2.2 |
| Tars | 6.7 | was treated with twice its weight of cyclohexane in the manner described in the previous examples; a yield of 78.8% of very pure alpha-naphthol was obtained, melting at 95° C.

We claim:

1. Method for extracting naphthol from mixtures of the same with one or more materials selected from the group consisting of naphthalene, partially hydrogenated naphthalenes, and hydroxy and keto substituted partially

TABLE I

| Example No. | Solvent | | 1st Crystallisation | | 2nd Crystallisation | |
|---|---|---|---|---|---|---|
|  | Nature | Proportion | Yield (percent) | M.P. (° C.) | Yield (percent) | M.P. (° C.) |
| 1 | Cyclohexane | 1.5 | 63 | 93.4 | 58.4 | 94.95 |
| 2 | do | 2 | 64 | 94.7 | 60.1 | 94.90 |
| 3 | do | 3 | 61 | 94.55 | 55.6 | 95.1 |
| 4 | Methyl-cyclohexane | 2 | 64 | 94.6 | 60.9 | 94.95 |
| 5 | Spirit E | 3 | 64.2 | 92.9 | 64.0 | 94.6 |
| 6 | do | 5 | 57 | 94.6 | 56.3 | 94.95 |
| 7 | Spirit C | 5 | 55.2 | 94.7 |  |  |
| 8 | Decalin | 1.5 | 52.3 | 94.5 |  |  | hydrogenated naphthalenes, which consists in: treating the mixture with a liquid saturated hydrocarbon, having 5 to 12 carbon atoms in its molecule, in an amount sufficient for dissolving the components of the mixture other than naphthol; allowing the naphthol to crystallize; and separating the crystallized naphthol from its mother liquor.

2. Method for extracting alpha-naphthol from mixtures of the same with one or more materials selected from the group consisting of 5,6,7,8-tetrahydro-alpha-naphthol, 1-keto-1,2,3,4-tetrahydronaphthalene, 1-hydroxy-1,2,3,4-tetrahydronaphthalene, 1,2-dihydronaphthalene, 1,4-dihydronaphthalene, tetrahydronaphthalene, naphthalene and tars, which consists in: treating the mixture with a liquid saturated hydrocarbon having 5 to 12 carbon atoms in its molecule, selected from the group consisting of aliphatic and alicyclic hydrocarbons, in an amount sufficient for dissolving the components of the mixture other than alpha-naphthol; allowing the alpha-naphthol to crystallize; and separating the crystals of alpha-naphthol from their mother liquor.

3. Method according to claim 2, wherein the amount of said liquid saturated hydrocarbons is of 1 to 5 parts by weight per part of the mixture treated, while the dissolution of the mixture is effected at a temperature comprised between ambient temperature and the boiling point of the hydrocarbon, the crystallizing and separating of the crystals of alpha-naphthol being carried out at a temperature between 0° C. and the ambient one.

4. Method for the extraction of alpha-naphthol from mixtures of the same with alpha-tetralone, which consists in: treating the mixture with a liquid saturated hydrocarbon having in its molecule at least 5 carbon atoms, in an amount sufficient to dissolve the tetralone; allowing the alpha-naphthol to crystallize in the solution thus obtained; and separating the crystals of alpha-naphthol from the solution.

5. Method for the extraction of alpha-naphthol from mixtures of the same with alpha-tetralone, which consists in: treating the mixture with a liquid saturated hydrocarbon having in its molecule 5 to 12 carbon atoms, in an amount of 1 to 10 times the weight of the mixture to dissolve the same; allowing the alpha-naphthol to crystallize in the solution thus obtained; and separating the crystals of alpha-naphthol from the solution.

6. Method for the extraction of alpha-naphthol from mixtures of the same with alpha-tetralone, which consists in: treating the mixture with a liquid saturated hydrocarbon having in its molecule 5 to 12 carbon atoms, in an amount of 1 to 10 times the weight of the mixture to dissolve the same in the heat, at a temperature which does not exceed the boiling point of said liquid hydrocarbon; cooling the solution thus obtained to crystallize alpha-naphthol; and separating the crystals of alpha-naphthol from the solution.

7. Method for extracting alpha-naphthol from mixtures of the same with alpha-tetralone, which consists in dissolving 1 part by weight of the mixture in 1 to 10 parts of an aliphatic liquid hydrocarbons fraction boiling below 150° C., the dissolution being effected at a temperature above the ambient temperature but not exceeding the boiling temperature of said hydrocarbons fraction; cooling the solution thus obtained down to a temperature between 0° C. and ambient, to allow alpha-naphthol to crystallize; and separating the crystals of alpha-naphthol from the solution.

8. Method for extracting alpha-naphthol from mixtures for the same with alpha-tetralone, which consists in: dissolving 1 part by weight of the mixture in 1 to 10 parts of an alicyclic hydrocarbon selected from the group consisting of cyclopentane, methyl-cyclopentane, cyclohexane, methyl-cyclohexane, cycloheptane and decahydronaphthalene, the dissolution being effected at a temperature above the ambient temperature but not exceeding the boiling temperature of said alicyclic hydrocarbon; cooling the solution thus obtained to a temperature between 0° C. and ambient; allowing alpha-naphthol to crystallize; and separating the crystals of alpha-naphthol from the solution.

No references cited.

LEON ZITVER, *Primary Examiner.*

D. H. HELFER, *Assistant Examiner.*